Figures 1, 2, 3, 4:
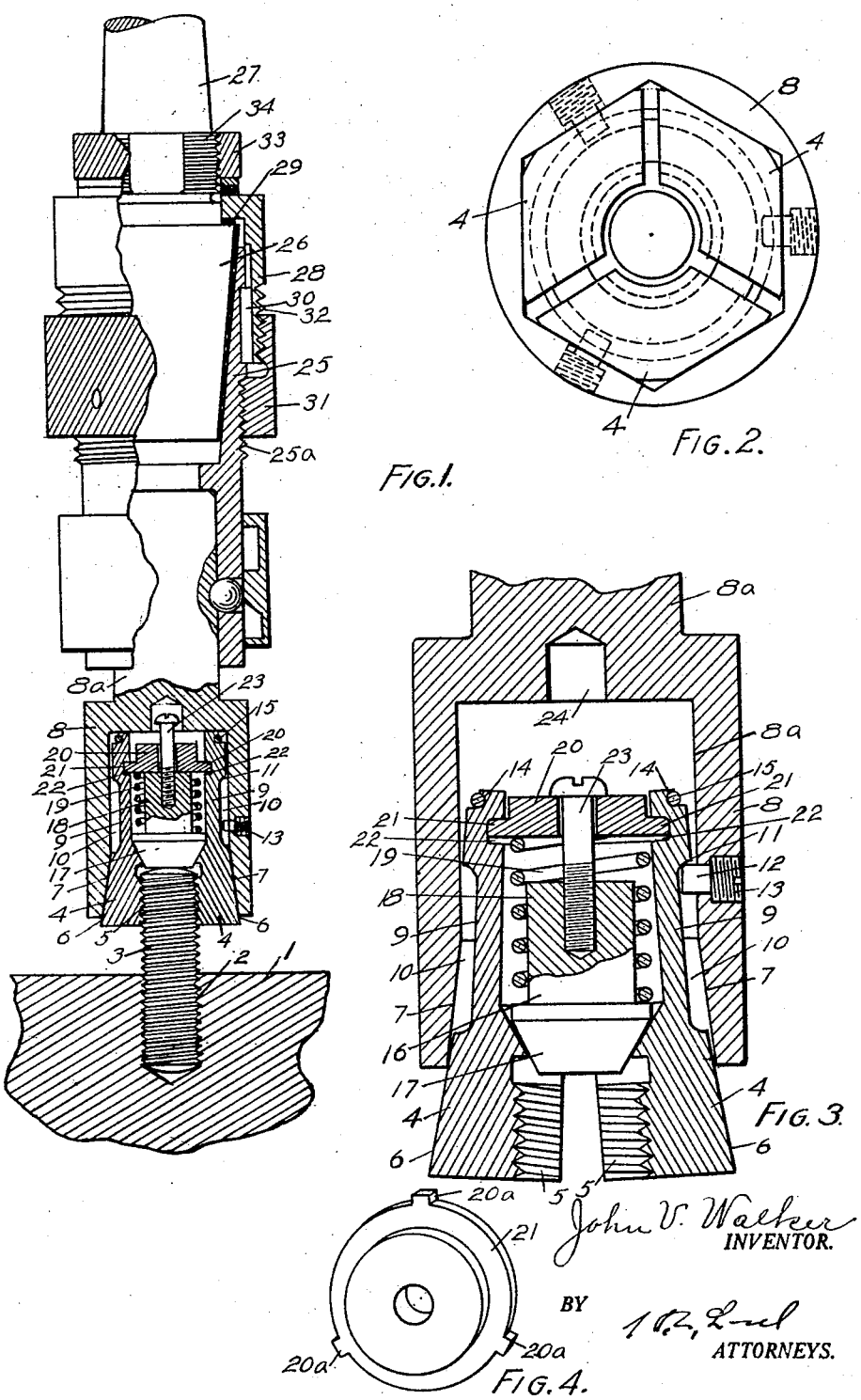

May 26, 1931. J. V. WALKER 1,807,264
SELF OPENING TOOL
Filed Feb. 27, 1929

John V. Walker
INVENTOR.

BY
ATTORNEYS.

Patented May 26, 1931

1,807,264

UNITED STATES PATENT OFFICE

JOHN V. WALKER, OF FAIRVIEW, PENNSYLVANIA, ASSIGNOR TO TITAN TOOL COMPANY, OF ERIE, PENNSYLVANIA, A CORPORATION OF PENNSYLVANIA

SELF-OPENING TOOL

Application filed February 27, 1929. Serial No. 342,990.

Self-opening tools have many uses. The present invention is particularly designed for driving studs and provides a very rugged, simple and efficient structure for this purpose. Features and details of the invention will appear from the specification and claims.

A preferred embodiment of the invention is illustrated in the accompanying drawings as follows:—

Fig. 1 is a vertical sectional view of the device.

Fig. 2 a bottom view of the device.

Fig. 3 a sectional view corresponding to that of Fig. 1 showing the device in open position.

Fig. 4 a perspective view of an opening and spreading cap for the device.

1 marks the work having a screw-threaded opening 2 into which a stud 3 is being driven. Jaws 4 are of separable form and have threads 5 on their inner faces adapted to engage the threads of the stud and have tapered surfaces 6 at their outer peripheries engaging a tapered surface 7 in a driving sleeve 8. The tapered surface 7 is of polygonal form. As shown it is of hexagonal form and the tapered surfaces of the jaws conform to the surfaces of the head with the jaws in closed position, each jaw comprising one angle and two sides of the periphery. The head 7 has a cylindrical surface 8a extending from the tapered portion and the jaws have cylindrically-shaped shanks 9 extending into this portion. The jaws are each provided with an axially-extending groove 10, the upper end 11 of the locking groove forming a stop shoulder. Locking pins 12 are carried by screws 13 in the wall of the sleeve 8. These pins lock the jaws against rotation relatively to the head, or in any event locate them initially so that when they close the angles of the tapered portions of the jaws register with the angles of the socket so that there is an immediate engagement of these surfaces giving a rigid wrench-hold of the jaw by the head.

The jaws are provided with peripheral grooves 14 at their ends and a split ring 15 is arranged in this groove. An opening plug 16 has a tapered end 17 operating on tapered surfaces on the inside of the jaws 4. This plug has an extension 18 around which a coiled spring 19 is arranged and this operates against a pressure and separating plate 20. This has extensions 21 which extend into a peripheral groove 22 on the insides of the jaws at their upper ends. The plate 20 has projections 20a which extend into the space between the jaws and thus maintain the separation of the jaws. A screw 23 extends through the plate 20 into the extension 18 and limits the outward movement of the opening plug, as indicated in Fig. 3. The screw extends into a socket 24 in the head and the jaws are closed.

In the operation of the device when the article is pressed downwardly on to a stud, the stud engaging the opening plug 17 forces the jaws upwardly into the socket firmly seating the polygonal outer periphery of these jaws into the tapered socket at the lower end of the head. This gives a very positive and secure wrench-hold directly at the driving end of the head. When the stud reaches its limit of movement the driving head is preferably allowed to yield through a slip driving device, any slip driving device accomplishing the purpose, the one specifically shown and hereinafter described being suitable for that purpose. When the stud has been driven and the head retracted the jaws are opened by the opening plug and this disengages the threads of the jaws from the threads of the stud and permits of the withdrawal of the tool. The head is provided with a shank 8a and is connected by any suitable connecting device with a slip driving device. This slip driving device comprises a tapered outer member 25 connected with the head, and a tapered inner member 26 operating in the outer member. The tapered inner member is connected with a source of power by a shank 27. A flanged sleeve 28 engages a shoulder 29 at the upper end of the inner tapered member and is locked with the outer tapered member by a spline 30. An adjusting nut 31 operates on screw threads 25a on the outer member and screw threads 32 on the sleeve 28. The threads 25a and 32 are of different pitch giving a very nice adjustment of the tapered portions. A nut 33 is arranged on screw threads 34 on the shank and locks the sleeve 28 against upward movement. This slip driving device operates in the ordinary manner. It is adjusted to have a driving action with as much power as desired and to slip where greater resistance is encountered.

What I claim as new is:—

1. In a self-opening tool, the combination of a head having a tapered socket, said socket having a peripheral wall of polygonal form; separable jaws in the socket conforming approximately when closed to the socket walls; a mounting for said jaws slidable in the head to open and close the jaws; and spring-actuated means opening the jaws, comprising a plug having wedging surfaces slidingly mounted within the jaws said plug forming a bottoming surface with the jaws in closed position, and a spring exerting pressure on the plug.

2. In a self-opening tool, the combination of a head having a tapered socket, said socket having a peripheral wall of polygonal form; separable jaws in the socket conforming approximately when closed to the socket walls; a mounting for said jaws slidable in the head to open and close the jaws; and spring-actuated means opening the jaws, comprising a plug having wedging surfaces slidingly mounted within the jaws said plug forming a bottoming surface with the jaws in closed position, a spring exerting pressure on the plug, and a stop limiting the outward movement of the plug.

3. In a self opening tool, the combination of a head having a tapered socket, the opening end of the socket having a peripheral wall of polygonal form; separable jaws within the socket having an outer periphery substantially conforming to the socket and each jaw having an angle and two sides conforming to an angle and two sides in the periphery of the socket and said jaws having axially extending grooves; pins carried by the head extending into the grooves; a plug arranged within the jaws, said plug terminating in inclined walls adapted to open the jaws; a spring operating on the plug; a base for the plug anchored on the jaws, said plug forming a bottoming surface with the jaws in closed position; and a screw extending through the base and limiting the outer movement of the plug.

In testimony whereof I have hereunto set my hand.

JOHN V. WALKER.